US007285617B2

(12) United States Patent
Poloso et al.

(10) Patent No.: US 7,285,617 B2
(45) Date of Patent: Oct. 23, 2007

(54) OXYGEN TAILORING OF POLYETHYLENE BLOW MOLDING RESINS

(75) Inventors: Anthony Poloso, Praireville, LA (US); Jerry M Johnson, League City, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 237 days.

(21) Appl. No.: 10/962,342

(22) Filed: Oct. 8, 2004

(65) Prior Publication Data

US 2006/0079664 A1    Apr. 13, 2006

(51) Int. Cl.
*C08F 6/00* (2006.01)
(52) U.S. Cl. .................. 528/480; 264/83; 264/141; 264/210.3
(58) Field of Classification Search .............. 264/83, 264/141, 210.3; 428/35.2, 35.5; 528/483
See application file for complete search history.

(56) References Cited

U.S. PATENT DOCUMENTS

| 33,269 | A | 9/1861 | Smith |
| 4,226,905 | A | 10/1980 | Harbourne |
| 4,460,750 | A | 7/1984 | Thiersault et al. |
| 4,578,431 | A | 3/1986 | Shaw et al. |
| 4,614,764 | A | 9/1986 | Colombo et al. |
| 5,032,562 | A | 7/1991 | Lo et al. |
| 5,073,598 | A | 12/1991 | Anzini |
| 5,405,917 | A | 4/1995 | Mueller, Jr. et al. |
| 5,486,575 | A | 1/1996 | Shroff |
| 5,525,678 | A | 6/1996 | Mink et al. |
| 5,530,072 | A | 6/1996 | Shirodkar |
| 5,728,335 | A | 3/1998 | Neubauer .............. 264/83 |
| 5,736,618 | A | 4/1998 | Poloso |
| 5,739,266 | A * | 4/1998 | Piana ................. 528/483 |
| 5,916,926 | A | 6/1999 | Cooper et al. |
| 6,114,486 | A | 9/2000 | Rowland et al. |
| 6,147,167 | A | 11/2000 | Mack et al. ........... 525/333.8 |
| 6,187,423 | B1 | 2/2001 | Maeger et al. |
| 6,221,925 | B1 | 4/2001 | Constant et al. |
| 6,248,840 | B1 | 6/2001 | Sukhadia et al. |
| 6,392,056 | B1 | 5/2002 | Wood et al. |
| 6,878,454 | B1 * | 4/2005 | Shannon et al. ........ 428/523 |

FOREIGN PATENT DOCUMENTS

| EP | 0 457 441 | 4/1991 |
| EP | 700 769 | 3/1996 |
| EP | 729 387 | 9/1996 |
| EP | 1 408 055 | 4/2004 |
| WO | WO 03/047839 | 6/2003 |
| WO | WO 04/005357 | 1/2004 |

* cited by examiner

*Primary Examiner*—Terressa Boykin (57) ABSTRACT

Processes are disclosed for oxygen-tailoring polyethylene blow molding resin. Polyethylene resin is conveyed through a feed zone, a melt-mixing zone and a melt zone, wherein the temperature of the polyethylene resin is from about 216° C. to about 260° C. in the melt zone. The resin is contacted with oxygen in an amount of at least about 20 parts by weight oxygen per million parts by weight resin. The oxygen-treated resin can be used to make polyethylene blow molded articles having improved melt strength, processability, and die swell.

36 Claims, 2 Drawing Sheets

OXYGEN TAILORING OF POLYETHYLENE BLOW MOLDING RESINS

FIELD OF THE INVENTION

The present invention is directed to methods of extruding polyethylene homopolymer and copolymer resins. More particularly, the invention provides methods of oxygen tailoring polyethylene blow molding resins to improve the melt strength, processability, and die swell made from such resins.

BACKGROUND

Tailoring of resins, such as polyethylene homopolymer or copolymer resins, is a well-known method of altering the molecular architecture and thus the bulk properties of the resin and of films and articles made therefrom. Tailoring involves treating the resin with an agent, such as a peroxide or oxygen, capable of controlled modification of the resin. The effect of tailoring on the resin rheological properties can be seen in at least one of: an increase in low shear viscosity, a decrease in high shear viscosity, an increase in elasticity, an increase in melt tension, or a reduction in swelling during blow molding.

A particularly useful application for polyethylene resins is in blow molding. The melt strength, processability, and die swell of blow molding resins, particularly blow molding resins of medium density polyethylene (MDPE) and high density polyethylene (HDPE) resins, frequently are not adequate for efficiently producing the articles required for many applications. Attempts have been made to tailor polyethylene resins to improve resin or film properties; see, e.g., European Patent Publication No. EP 0 457 441, and U.S. Pat. Nos. 5,728,335; 5,739,266; and 6,147,167. However, it would be desirable to have improved methods of extruding polyethylene, particularly pelletized medium or high density polyethylene blow molding resin, to provide resins having improved melt strength, processability, and die swell.

SUMMARY

In one embodiment, the present invention provides a process for oxygen-tailoring polyethylene blow molding resin. The process includes conveying polyethylene homopolymer or copolymer resin in a downstream direction through a feed zone, a melt-mixing zone downstream of the feed zone, and a melt zone downstream of the melt-mixing zone, wherein the temperature of the polyethylene resin is from about 420° F. (216° C.) to about 500° F. (260° C.) in the melt zone; and contacting the resin with oxygen in an amount of at least about 20 parts by weight oxygen per million parts by weight resin (ppm (wt) $O_2$). In an embodiment, the resin is contacted with a primary antioxidant. The resin can further be pelletized. In an embodiment, the resin is contacted with oxygen in the feed zone. In an alternative embodiment, the resin is contacted with oxygen in the melt-mixing zone. In yet another embodiment, the resin is contacted with oxygen in the melt zone.

In another embodiment, the invention provides a process for extruding polyethylene blow molding resin. The process includes conveying polyethylene homopolymer or copolymer resin through a feed zone, a melt-mixing zone downstream of the feed zone, and a melt zone downstream of the melt-mixing zone, wherein the temperature of the polyethylene resin is from about 420° F. (216° C.) to about 500° F. (260° C.) in the melt zone; and contacting the resin with oxygen in an amount of at least about 20 parts by weight oxygen per million parts by weight resin (ppm (wt) $O_2$). In another embodiment the resin is contacted with a primary antioxidant. The resin can further be pelletized. In a particular embodiment, the pelletized, oxygen-treated resin is used to make a polyethylene blow molded article having increased melt strength, increased processability, and reduced die swell.

In an alternative embodiment, the invention provides a process for oxygen-tailoring a high density polyethylene blow molding resin having a bimodal molecular weight distribution. The process includes conveying polyethylene resin having a density of at least about 0.945 g/cm³ and a ratio Mw/Mn of at least about 12 in a downstream direction through a feed zone, a melt-mixing zone downstream of the feed zone, and a melt zone downstream of the melt-mixing zone, wherein the temperature of the polyethylene resin is from about 420° F. (216° C.) to about 500° F. (260° C.) in the melt zone; and contacting the resin in the melt-mixing zone with oxygen in an amount of from about 20 to about 500 parts by weight $O_2$ per million parts by weight resin (Ppm (wt) $O_2$). In another embodiment the resin is contacted with a primary antioxidant. The primary antioxidant can be a phenolic antioxidant, a hindered amine antioxidant, or a mixture thereof. Furthermore the primary antioxidant can be contacted with the resin downstream or upstream of where the resin is contacted with oxygen. In another embodiment, the temperature of the polyethylene resin range from about 425° F. (218° C.) to about 450° F. (232° C.) in the melt zone.

In another embodiment, the invention provides a process from oxygen-tailoring polyethylene blow molding resin comprising conveying the polyethylene resin having a Mw/Mn greater than about 12 through a feed zone, a melt-mixing zone downstream of the feed zone, and a melt zone downstream of the melt-mixing zone, wherein the temperature of the polyethylene resin ranges from about 216° C. to about 260° C. in the melt zone; and contacting the resin with sufficient oxygen to form an oxygen-contacted resin, wherein the oxygen-contacted resin has a tailoring ratio ranging from about 20 to about 35.

In other embodiments, the invention provides polyethylene blow molding resin formed by the inventive processes, and polyethylene blow molded articles formed of or including such resins.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The polyethylene blow molding resin to be oxygen-tailored can be a polyethylene homopolymer or copolymer of ethylene and one or more $C_3$-$C_{20}$ alpha-olefin comonomers. In an embodiment the invention provides polyethylene blow molding resin formed by the inventive processes, and polyethylene blow molded articles formed of or including such resins. As used herein, the term "ethylene copolymer" indicates a polymer formed of more than 50 mol % polymerized ethylene units, and the remaining less than 50 mol % polymerized units being polymerized α-olefin comonomers, such as $C_3$-$C_{20}$ α-olefins or $C_3$-$C_{12}$ α-olefins. Suitable α-olefin comonomers can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly preferred comonomers are 1-butene, 1-hexene and 1-octene. It should be appreciated that the list of comonomers above is merely exemplary, and is not intended to be limiting.

Optionally, other comonomers can be used in minor amounts, such as less than 5 mol %, and such minor comonomers include polar vinyl olefins, for example, such as vinyl acetate, methyl acrylate, butyl acrylate, and acrylic acid; conjugated and non-conjugated dienes; acetylene and aldehyde monomers. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

The polyethylene blow molding resin can be any resin capable of melt extrusion, and can have a density of from 0.890 to 0.970 g/cm$^3$. In another embodiment, the polyethylene resin is an MDPE resin, with a density of from 0.930 to 0.940 g/cm$^3$, produced in a gas phase or in a slurry process. In another embodiment the polyethylene resin has a molecular weight distribution (MWD) of at least 12. In an alternative embodiment the polyethylene resin has a MWD of at least 13. In still another embodiment the polyethylene resin has a molecular MWD of at least 14. In an alternative embodiment the polyethylene resin has a molecular MWD of at least 15. In yet another alternative embodiment the polyethylene resin has a MWD of at least 16. The MWD is a ratio of the weight average molecular weight divided by the number average molecular weight, and is represented by: Mw/Mn, as determined by ASTM 6579. Polyethylene in the density range of from 0.916 to 0.940 g/cm$^3$ which is linear and does not contain long chain branching is also known; this "linear low density polyethylene" ("LLDPE") can be produced with conventional Ziegler-Natta or chromium-based catalysts or with metallocene catalysts. In another embodiment, the polyethylene resin is an LLDPE. Polyethylenes having still greater density are the high density polyethylenes ("HDPEs"), i.e., polyethylenes having densities greater than 0.940 g/cm$^3$, and are generally prepared with Ziegler-Natta catalysts. In another embodiment, the polyethylene resin is an HDPE. In any of these embodiments, the polyethylene resin can also be a mixture of two or more polyethylenes.

In one embodiment, the polyethylene blow molding resin is a medium or high density resin having a relatively higher molecular weight (HMW) component and a relatively lower molecular weight (LMW) component. Such resins can be characterized by a bimodal molecular weight distribution function, i.e., a plot of weight fraction versus molecular weight that is a convolution of at least two distribution functions of differing average molecular weight. It should be appreciated that the maxima of the two distribution functions can be resolved or can appear as a single broad maximum, depending upon the shapes of the distribution functions, the difference in average molecular weight, and the relative amounts of the two components. Thus, resins having a broad molecular weight distribution function which is a convolution of at least an HMW component and an LMW component are termed "bimodal", and their convoluted distribution function termed "bimodal" regardless of whether their individual maxima can be resolved.

In one embodiment, the polyethylene blow molding resin is an MDPE resin having a bimodal molecular weight distribution, wherein a plot of the distribution includes a single broad maximum that is an unresolved convolution of at least an HMW and an LMW component.

In another embodiment, the polyethylene blow molding resin is an MDPE resin having a bimodal molecular weight distribution, wherein a plot of the distribution includes two maxima—attributable to an HMW and an LMW component.

In another embodiment, the polyethylene blow molding resin is an HDPE resin having a bimodal molecular weight distribution, wherein a plot of the distribution includes a single broad maximum which is an unresolved convolution of at least an HMW and an LMW component.

In another embodiment, the polyethylene blow molding resin is an HDPE resin having a bimodal molecular weight distribution, wherein a plot of the distribution includes two maxima—attributable to an HMW and an LMW component.

Bimodal resins can be produced in tandem reactors, such as tandem gas phase reactors or tandem slurry reactors or a combination, such as a gas phase reactor in tandem with a slurry reactor. Alternatively, mixed catalyst systems, such as mixed metallocenes or bimetallic catalysts such as those disclosed in U.S. Pat. Nos. 5,032,562 and 5,525,678, and European Patent EP 0 729 387, can produce bimodal polyolefin resins in a single reactor. These catalysts typically include a non-metallocene catalyst component and a metallocene catalyst component, which produce polyolefins having different average molecular weights. U.S. Pat. No. 5,525,678, for example, discloses a bimetallic catalyst in one embodiment including a titanium non-metallocene component which produces a higher molecular weight resin, and a zirconium metallocene component which produces a lower molecular weight resin. Controlling the relative amounts of each catalyst in a reactor, or the relative reactivities of the different catalysts, allows control of the bimodal product resin.

Alternatively, the bimodal resin can be a physical blend of two or more resins, the blend being formed by mixing the resins in a conventional mixer, such as a Banbury mixer.

In a particular embodiment, the bimodal resin is an HDPE resin produced in a series of two stirred slurry reactors using Ziegler-Natta catalysts, wherein a HMW component is produced in a first reactor and a LMW component is produced in a second reactor in series with the first reactor, or the LMW component produced in the first reactor and the HMW component produced in the second reactor in series with the first reactor. If desired, hydrogen can be added as a chain-termination agent to control molecular weight, and the amount of hydrogen used in each reactor can be different. Typical operating pressures are less than about 1 MPa, and typical operating temperatures are from about 70° C. to about 90° C. (about 158° F. to about 194° F.). Series reactors and slurry processes for producing polyethylene resins therein are well known in the art.

The polyethylene resin is processed in a mixer, such as a co- or counter-rotating, intermeshing or non-intermeshing twin screw mixer. Such mixers are well known in the art, and are commercially available from various sources, such as Kobe and Farrel. The resin is fed to the feeding zone of the mixer, where the temperature is below the melting temperature of the resin as the resin is compressed and conveyed toward the melt-mixing zone. Typically, the temperature in the feeding zone is about 20° C. to about 100° C. (about 68° F. to about 212° F.), and is maintained by cooling the extruder walls. In the melt-mixing zone, the temperature is increased to at least partially melt the resin. In the melt zone, the temperature is sufficient to melt essentially all of the resin to provide a molten polyethylene resin. The temperature in the melt zone should be between about 420° F. (216° C.) to about 500° F. (260° C.), preferably between about 425° F. (218° C.) to about 450° F. (232° C.). Each zone is only partially filled with the resin; i.e., there are no completely filled zones. Although the terms "mixer" and "extruder" are often used loosely and interchangeably, one skilled in the art will appreciate that mixers, such as the commercially available Kobe or Farrel mixers, operate at relatively low pressures, typically about 100 psi (689 kPa) or less, and the zones within the mixer are generally not completely filled with resin. In contrast, extruders, such as are commercially available from, for example, Werner-Pfleiderer, operate at much higher pressures, typically at least several hundred or several thousand psi, and the various zones within the extruder are generally completely filled with resin.

Figure 1:
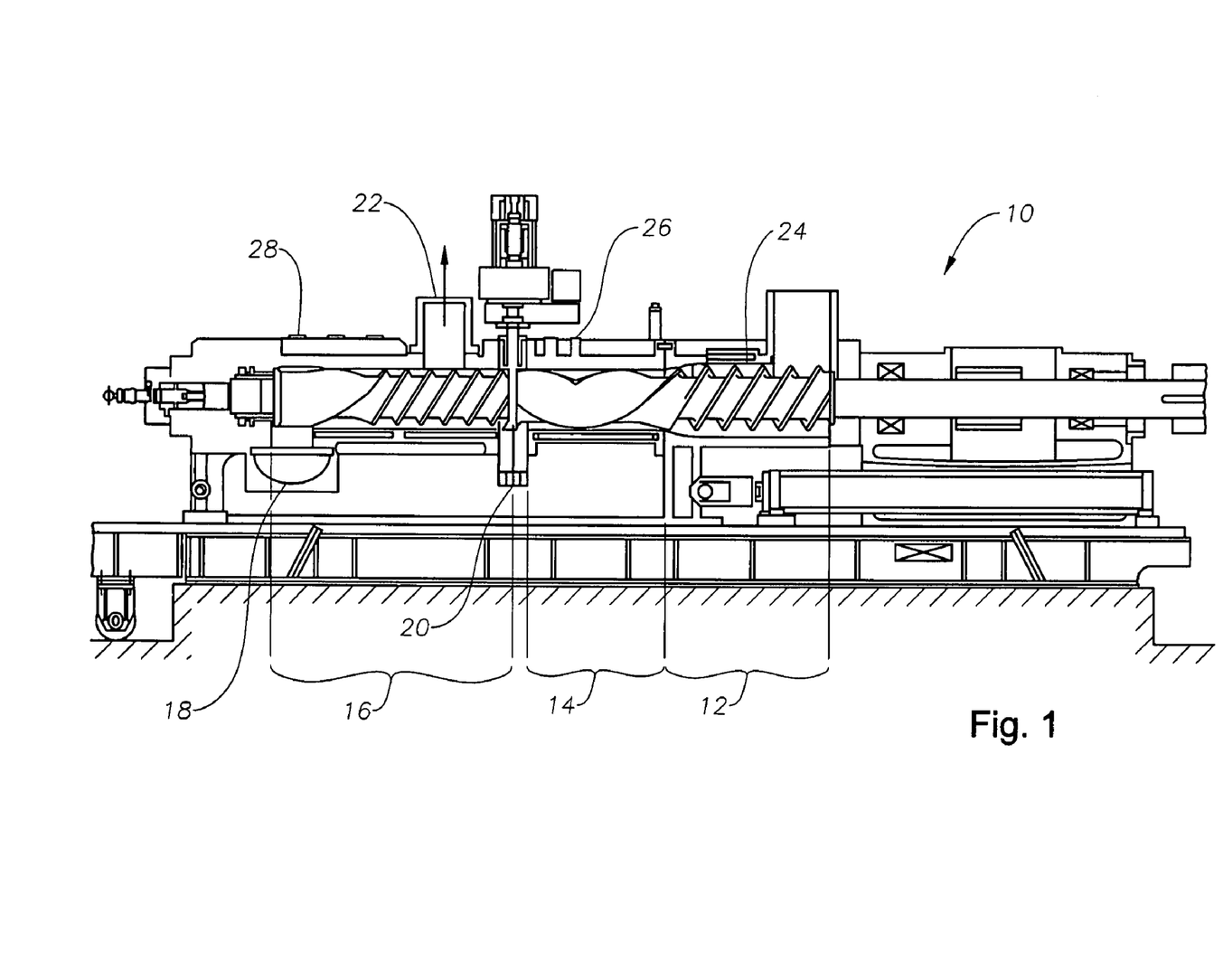
FIG. 1 is a schematic diagram of a Kobe mixer.

Although not limited to any particular mixer, a process of the invention is illustrated now by specific reference to FIG. 1, showing a schematic diagram of a Kobe mixer 10. Mixer 10 includes a feed zone 12, a mixing zone 14, and a melt-conveying zone 16. Resin and optional additives are provided to mixer 10 in the feed zone 12, and the resin is conveyed in a downstream direction through the mixing zone 14 and the melt-conveying zone 16. Gate 20 separates the mixing zone 14 from the melt-conveying zone 16. An optional vent 22 is shown in FIG. 1 in the melt-conveying zone 16. As described above, the resin is generally at least partially melted in mixing zone 14, and generally, but not necessarily, essentially completely melted in melt-conveying zone 16. The resin is conveyed through the mixer discharge 18 and further processed, such as by pelletizing.

Figure 2:
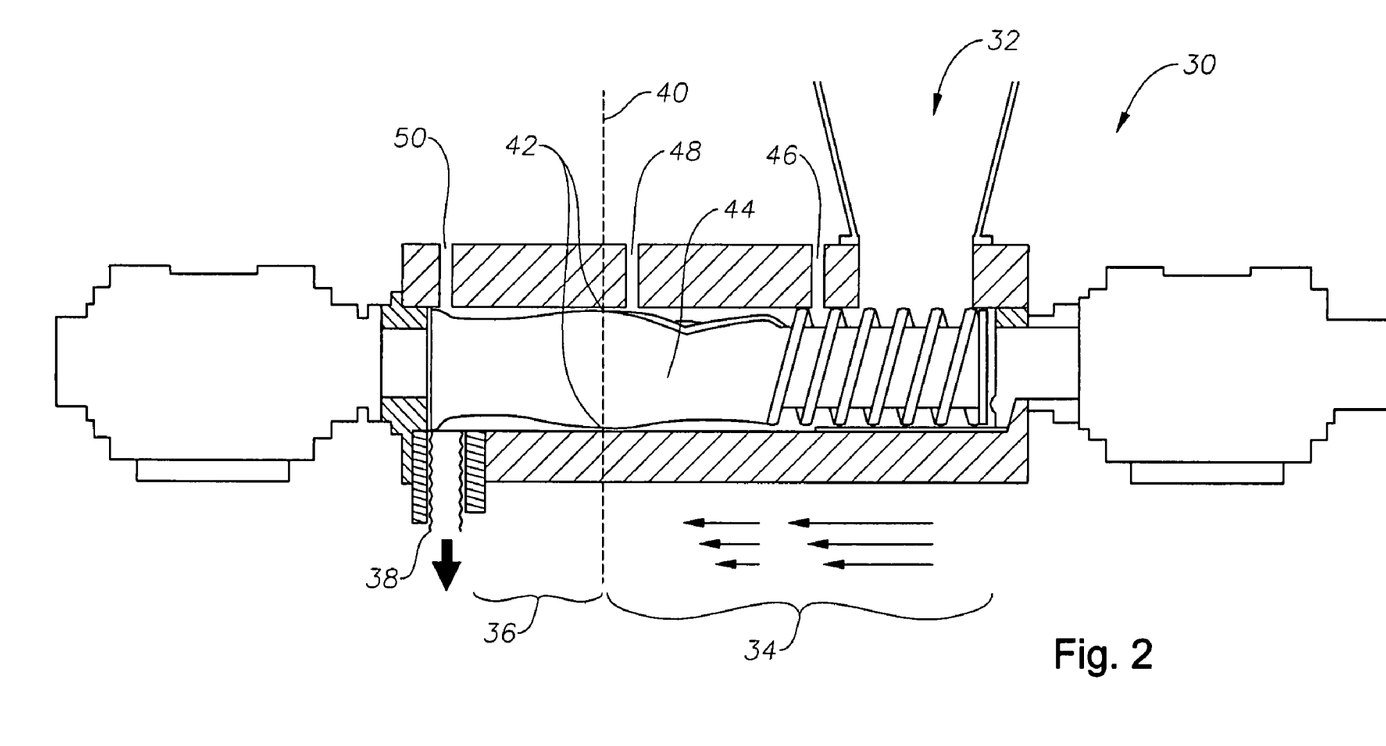
FIG. 2 is a schematic diagram of a Farrel mixer.

Turning now to FIG. 2, specific reference is made to a Farrel mixer 30. Mixer 30 includes a feed zone 32, a mixing zone 34, and a melt zone 36. Resin and optional additives are provided to mixer 30 in the feed zone 32, and the resin is conveyed in a downstream direction through the mixing zone 34 and the melt zone 36. As described above, the resin is generally at least partially melted in mixing zone 34, and generally, but not necessarily, essentially completely melted in melt zone 36. The resin is conveyed through the mixer discharge 38 and further processed, such as by pelletizing. The Farrel mixer does not have a gate, such as gate 20 of the Kobe mixer, separating the mixing zone from the melt zone. However, mixing zone 34 and melt zone 36 are effectively separated by a narrow clearance region shown by dashed line 40 corresponding to the apex 42 of mixing element 44.

The resin can be processed at a melt temperature of from a lower limit of about 420° F. (216° C.) or about 425° F. (218° C.) or about 430° F. (221° C.) to an upper limit of less than about 500° F. (260° C.) or less than about 490° F. (254° C.) or less than about 480° F. (249° C.) or less than about 470° F. (243° C.) or less than about 460° F. (238° C.) or less than about 450° F. (232° C.) or less than about 440° F. (227° C.) or less than about 430° F. (221° C.), where the melt temperature is the temperature at the downstream end of the mixing zone. For example, in FIG. 1, the melt temperature is the temperature at gate 20, and in FIG. 2, the melt temperature is the temperature at the apex 42.

It should be appreciated that mixers other than the Kobe and Farrel mixers illustrated herein can be used.

The resin is contacted with oxygen and with primary antioxidant, and optionally, a secondary antioxidant. Oxygen can be contacted with the resin in the feed zone, the mixing zone or the melt zone, or in more than one of such zones. In any zone in which oxygen is contacted with the resin, the oxygen can be contacted, for example, through one or more gas inlet ports. Referring to FIG. 1, for example, in some embodiments, oxygen can be provided through one or both of inlets 24 and 26. Referring to FIG. 2, for example, in some embodiments, oxygen can be contacted through one or both of inlets 46 and 48. It should be appreciated that these specific inlet positions are merely exemplary.

Oxygen can be contacted, with the resin, as a continuous flow of gas or, alternatively, oxygen can be provided intermittently.

Oxygen gas can be provided as an essentially pure gas, or as part of a gas mixture, such as air.

The amount of oxygen used can be expressed as parts by weight of $O_2$ per million parts by weight of resin, abbreviated as ppm (wt) $O_2$. For a system in which the oxygen is provided as a continuous flow, the amount of oxygen in units of ppm (Wt) $O_2$ can be calculated by normalizing the oxygen mass flow rate to the resin mass flow rate. The oxygen mass flow rate can be measured using a conventional gas mass flow meter. For example assume polyethylene resin was processed in a commercial-scale Kobe mixer operating at a resin mass flow rate of 58,000 lb/hr (26,300 kg/hr). The source of oxygen was dry air, having an $O_2$ content of 23-wt %, and the dry air mass flow rate was 30 lb/hr (13.6 kg/hr). The normalized oxygen amount is calculated as:

$$\text{ppm(wt)}O_2 = \frac{30 \text{ lb air/hr}}{58,000 \text{ lb resin/hr}} \times 0.23 \text{ lb } O_2/\text{lb air} = 1.19 \times 10^{-4} \text{ lb air/lb resin}$$

$$= 119 \text{ ppm(wt)}O_2$$

The analogous calculation using SI units gives the same value, since the mass units cancel.

Oxygen can be provided in an amount of at least about 20 ppm (wt) $O_2$, or at least about 40 ppm (Wt) $O_2$, or at least about 60 ppm (Wt) $O_2$, or at least about 80 ppm (wt) $O_2$, or at least about 100 ppm (Wt) $O_2$ or at least about 150 ppm (wt) $O_2$, or at least about 200 ppm (wt) $O_2$, or at least about 250 ppm (wt) $O_2$, or at least about 300 ppm (wt) $O_2$, or at least about 350 ppm (wt) $O_2$, or at least about 400 ppm (wt) $O_2$ or at least about 450 ppm (Wt) $O_2$ or at least about 500 ppm (wt) $O_2$. The upper limit of the oxygen amount depends on the degree of oxygen tailoring desired. If too much oxygen is used, an unacceptable amount of resin degradation will occur, as evidenced by a loss in various resin properties. Generally, the amount of oxygen will be up to about 500 ppm (Wt) $O_2$, or up to about 450 ppm (wt) $O_2$, or up to about 350 ppm (Wt) $O_2$, or up to about 300 ppm (Wt) $O_2$, or up to about 250 ppm (wt) $O_2$, or up to about 200 ppm (wt) $O_2$. Ranges from any recited lower limit to any recited upper limit are also contemplated.

The effect of oxygen tailoring depends on the amount of oxygen added and the temperature of the melt zone. The effect of oxygen tailoring can be quantified with a tailoring ratio. The tailoring ratio is the ratio of the viscosity of a resin at a low shear rate ($0.1\ sec^{-1}$) versus the viscosity of a resin at a high shear rate ($100\ sec^{-1}$). A relatively high viscosity at a low shear rate indicates relatively high melt strength. A relatively low viscosity at a high shear rate indicates relatively improved processability and decreased die swell. The shear rate of $100\ sec^{-1}$ is indicative of processability because normally extruders are operated at shear rates above $100\ sec^{-1}$. It is desired that the tailoring ratio be between 20 to 35, preferably 23-30, more preferably 25-27. In an embodiment the resin is contacted with sufficient oxygen to form an oxygen-contacted resin, wherein the oxygen-contacted resin has a tailoring ratio ranging from about 20 to about 35. In another embodiment, the resin is contacted with sufficient oxygen to form an oxygen-contacted resin, wherein the oxygen-contacted resin has a tailoring ratio ranging from about 23 to about 30. In another embodiment, the resin is contacted with sufficient oxygen to form an oxygen-contacted resin, wherein the oxygen-contacted resin has a tailoring ratio ranging from about 25 to about 27.

A primary antioxidant can be contacted with the resin upstream or downstream of the resin's contact of oxygen. Contacting primary antioxidant upstream of contacting oxygen with resin means to add the primary antioxidant at any point before the addition of the oxygen i.e., the primary antioxidant and the oxygen can be added in the same or different zone, so long as the primary antioxidant is added before the oxygen. Likewise contacting primary antioxidant downstream of contacting oxygen with resin means to add the primary antioxidant at any point after the addition of the oxygen i.e., the primary antioxidant and the oxygen can be added in the same or different zone, so long as the primary antioxidant is added after the oxygen. Moreover, primary antioxidant can be contacted with the resin contemporaneously with the contacting of oxygen. It has been found, however, that color is improved when the primary antioxidant is contacted with the resin downstream of contacting the resin with oxygen. Primary antioxidant can be provided in one or more of the feed zone, melt-mixing zone, and melt zone. Additionally, primary antioxidants can be added through one or more inlets. Referring to FIG. 1, primary antioxidant can be provided, for example, through inlet 28 near the end of the melt zone. Referring to FIG. 2, primary antioxidant can be provided, for example, through inlet 50 near the end of the melt zone. It should be appreciated that these specific inlet positions are merely exemplary.

Examples of primary antioxidants, sometimes termed "long-term antioxidants," include phenolic antioxidants and hindered amine antioxidants, such as are disclosed in U.S. Pat. No. 6,392,056. Suitable primary antioxidants are available commercially, such as the IRGANOX™ antioxidants available from Ciba Specialty Chemicals.

Examples of phenolic antioxidants include, but are not limited to:

octadecyl-3-(3,5-di-tert-butyl-4-hydroxyphenyl) propionate (IRGANOX™ 1076);

pentaerythritol tetrakis(3-(3,5-di-tert-butyl-4-hydroxyphenyl) propionate) (IRGANOX™ 1010);

3,3',3',5,5',5'-hexa-tert-butyl-a,a',a'-(mesitylene-2,4,6-triyl) tri-p-cresol (IRGANOX™ 1330);

1,3,5-tris(3,5-di-tert-butyl-4-hydroxybenzyl)-1,3,5-triazine-2,4,6(1H,3H,5H)-trione (IRGANOX™ 3114);

n-octadecyl-3,5-di-tert-butyl-4-hydroxyhydrocinnamate;

neopentanetetrayl tetrakis(3,5-di-tert-butyl-4-hydroxyhydrocinnammate);

di-n-octadecyl-3,5-di-tert-butyl-4-hydroxybenzylphosphonate, 1,3,5-tris(3,5-di-tert-butyl-4hydroxybenzyl)isocyanurate;

thiodiethylene bis(3,5-di-tert-butyl-4-hydroxyhydrocinnamate);

1,3,5-trimethyl-2,4,6-tris(3,5-di-tert-butyl-4-hydroxy-benzyl)benzene;

3,6-dioxaoctamethylene bis(3-methyl-5-tert-butyl-4-hydroxyhydrocinnamate);

2,6-di-tert-butyl-p-cresol; 2,2'-ethylidene-bis(4,6-di-tert-butylphenol);

1,3,5-tris(2,6-dimethyl-4-tert-butyl-3-hydroxybenzyl)isocyanurate;

1,1,3,-tris(2-methyl-4-hydroxy-5-tert-butylphenyl)butane;

1,3,5-tris[2-(3,5-di-tert-butyl-4-hydroxyhydrocinnamoyloxy)ethyl]isocyanurate;

3,5-di-(3,5-di-tert-butyl-4-hydroxybenzyl)mesitol;

hexamethylene bis(3,5-di-tert-butyl-4-hydroxyhydrocinnamate);

1-(3,5-di-tert-butyl-4-hydroxyanilino)-3,5-di(octylthio)-s-triazine;

N,N'-hexamethylene-bis(3,5-di-tert-butyl-4-hydroxyhydrocinnamamide);

calcium bis(ethyl 3,5-di-tert-butyl-4-hydroxybenzylphosphonate);

ethylene bis[3,3-di(3-tert-butyl-4-hydroxyphenyl)butyrate];

octyl 3,5-di-tert-butyl-4-hydroxybenzylmercaptoacetate;

bis(3,5-di-tert-butyl-4-hydroxyhydrocinnarnoyl)hydrazide; and

N,N'-bis[2-(3,5-di-tert-butyl-4-hydroxyhydrocinnamoyloxy)-ethyl]-oxamide.

Examples of hindered amines include, but are not limited to:

bis(2,2,6,6-tetramethylpiperidin-4-y)sebacate;

bis(1,2,2,6,6-pentamethylpiperidin-4-yl)sebacate;

di(1,2,2,6,6-pentamethylpiperidin-4-yl)-(3,5-di-tert-butyl-4-hydroxybenzyl)butylmalonate;

4-benzoyl-2,2,6,6-tetramethylpiperidine;

4-stearyloxy-2,2,6,6-tetramethylpiperidine;

3-n-octyl-7,7,9,9-tetramethyl-1,3,8-triaza-spiro-[4.5]decane-2,4-dione;

tris(2,2,6,6-tetramethylpiperidin-4-yl)nitrilotriacetate;

1,2-bis(2,2,6,6-tetramethyl-3-oxopiperazin-4-yl)ethane;

2,2,4,4-tetramethyl-7-oxa-3,20-diaza-21-oxodispiro [5.1.11.2]heneicosane;

polycondensation product of 2,4-dichloro-6-tert-octylamino-s-triazine and 4,4'-hexamethylenebis(amino-2,2,6,6-tetramethylpiperidine);
polycondensation product of 1-(2-hydroxyethyl)-2,2,6,6-tetramethyl-4-hydroxypiperidine and succinic acid;
polycondensation product of 4,4'-hexamethylenebis-(amino-2,2,6,6-tetra-methylpiperidine) and 1,2-dibromoethane;
tetrakis(2,2,6,6-tetramethylpiperidin-4-yl)-1,2,3,4-butanetetracarboxylate;
tetrakis(1,2,2,6,6-pentamethylpiperidin-4-yl)-1,2,3,4-butanetetracarboxylate;
polycondensation product of 2,4-dichloro-6-morpholino-s-triazine and 4,4'-hexamethylenebis(amino-2,2,6,6-tetramethylpiperidine);
N,N',N'',N'''-tetrakis[(4,6-bis(butyl-1,2,2,6,6-pentamethylpiperidin-4-yl)-amino-s-triazin-2-yl]-1,10-diamino-4,7-diazadecane;
mixed [2,2,6,6-tetramethylpiperidin-4-yl/β, β, β', β'-tetramethyl-3,9-(2,4,8,10-tetraoxaspiro[5. 5]-undecanediethyl] 1,2,3,4-butanetetracarboxylate;
mixed [1,2,2,6,6-pentamethylpiperidin-4-yl/β, β, β', β'-tetramethyl-3,9-(2,4,8,10-tetraoxaspiro[5. 5]-undecane)diethyl]1,2,3,4-butanetetracarboxylate;
octamethylene bis(2,2,6,6-tetramethyl-piperidin-4-carboxylate); 4,4'-ethylenebis(2,2,6,6-tetramethylpiperazin-3-one);
N-2,2,6,6-tetramethyl-piperidin-4-yl-n-dodecylsuccinimide;
N-1,2,2,6,6-pentamethyl-piperidin-4-yl-n-dodecylsuccinimide;
N-1-acetyl-2,2,6,6-tetramethylpiperidin-4-yl-n-dodecylsuccinimide;
1-acetyl-3-dodecyl-7,7,9,9-tetramethyl-1,3,8-triazaspiro[4. 5]decane-2,4-dione;
di-(1-octyloxy-2,2,6,6-tetramethylpiperidin-4-yl) sebacate;
di-(1-cyclohexyloxy-2,2,6,6-tetra-methylpiperidin-4-yl) succinate;
1-octyloxy-2,2,6,6-tetramethyl-4-hydroxy-piperidine;
poly-([6-tert-octylamino-s-triazin-2,4-diyl][2-(1-cyclohexyloxy-2,2,6,6-tetramethylpiperidin-4-yl)imino-hexamethylene-[4-(1-cyclohexyloxy-2,2,6,6-tetramethylpiperidin-4-yl)imino];
2,4,6-tris[N-(1-cyclohexyloxy-2,2,6,6-tetramethylpiperidin-4-yl)-n-butylamino]-s-triazine;
bis[1-(2-hydroxy-2-methylpropoxy)-2,2,6,6-tetramethylpiperidin-4-yl)]sebacate;
mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]adipate;
1-(2-hydroxy-2-methyl-propoxy)-4-octadecanoyloxy-2,2,6,6-tetramethylpiperidine;
bis[1-(2-hydroxy-2-methylpropoxy)-2,2,6,6-tetramethylpiperidin-4-yl]-adipate;
bis[1-(2-hydroxy-2-methylpropoxy)-2,2,6,6-tetramethyl-piperidin-4-yl]-glutarate;
bis[1-(2-hydroxy-2-methylpropoxy)-2,2,6,6-tetramethylpiperidin-4-yl]-succinate;
mixture of bis[1-(2-hydroxy-2-methylpropoxy)-2,2,6,6-tetramethylpiperidin-4-yl]glutarate and bis[1-(2-hydroxy-2-methylpropoxy)-2,2,6,6-tetramethylpiperidin-4-yl]succinate;
1-(4-octadecanoyloxy-2,2,6,6-tetramethylpiperidin-1-yloxy)-2-octadecanoyloxy-2-methylpropane;
1-(2-hydroxy-2-methylpropoxy)-4-[9-(methoxy-carbonyl) nonanoyloxy]-2,2,6,6-tetramethylpiperidine;
1-(2-hydroxy-2-methylpropoxy)-4-[5-(methoxy-carbonyl) pentanoyloxy]-2,2,6,6-tetramethylpiperidine;
1-(2-hydroxy-2-methylpropoxy)-4-[3-(methoxy-carbonyl) propionyloxy]-2,2,6,6-tetramethylpiperidine;
1-(2-hydroxy-2-methylpropoxy)-4-[4-(methoxy-carbonyl)-butyryloxy]-2,2,6,6-tetramethylpiperidine;
condensation product of 4-hydroxy-1-(2-hydroxy-2-methylpropoxy)-2,2,6,6-tetramethylpiperidine with hexamethylene diisocyanate and terminated with methoxy;
condensation product of 4-hydroxy-1-(2-hydroxy-ethoxy)-2,2,6,6-tetramethyl-piperidine with hexamethylene diisocyanate and terminated with methoxy; and
condensation product of 4-hydroxy-1-(2-hydroxy-1-phenethoxy)-2,2,6,6-tetramethylpiperidine with hexamethylene diisocyanate and terminated with methoxy.

If desired, secondary antioxidants, sometimes termed "short-term antioxidants," can be added to the mixer at any convenient location. The secondary antioxidant can be contacted with the resin at the same time the primary antioxidant is contacted with the resin. In another embodiment, the secondary antioxidant can be contacted with the resin independent of the primary antioxidant. In yet another embodiment, the secondary antioxidant can be contacted with the resin before the primary antioxidant is contacted with the resin. Secondary antioxidant can be contacted with the resin upstream or downstream of the resin's contact with oxygen. Contacting secondary antioxidant upstream of contacting oxygen with resin means to add the secondary antioxidant at any point before the addition of the oxygen i.e., the secondary antioxidant and the oxygen can be added in the same or different zone, so long as the secondary antioxidant is added first. Likewise contacting secondary antioxidant downstream of contacting oxygen with resin means to add the secondary antioxidant at any point after the addition of the oxygen i.e., the secondary antioxidant and the oxygen can be added in the same or different zone, so long as the secondary antioxidant is added later. Moreover, secondary antioxidant can be contacted with the resin contemporaneously with the contacting of oxygen. It has been found that color is improved when the secondary antioxidant is contacted with the resin downstream of contacting the resin with oxygen. Secondary antioxidant can be provided in one or more of the feed zone, melt-mixing zone, and melt zone. Additionally, secondary antioxidants can be added through one or more inlets. Typical secondary antioxidants are available commercially, such as the IRGAFOS™ antioxidants available from Ciba Specialty Chemicals.

Examples of secondary antioxidants include, for example, aliphatic thiols and phosphites. Specific examples of secondary antioxidants include distearyl pentaerythritol diphosphite, isodecyl diphenyl phosphite, diisodecyl phenyl phosphite, tris(2,4-di-t-butylphenyl)phosphite, dilauryl-β,β-thiodipropionate, β-naphthyl disulfide, thiol-β-naphthol, 2-mercaptobenzothiazole, benzothiazyl disulfide, phenothiazine, tris(p-nonylphenyl)phosphite, and zinc dimethyldithiocarbamate.

EXAMPLES

Die swell variation was determined using the tab width on bottles produced on a 4 head Uniloy blow molder Model 350R-2. The swell number reported is the width in inches of the bottom tab on the bottle produced at a constant 75-g bottle weight.

The term "Melt Index" refers to the melt flow rate of the resin measured according to ASTM D-1238, condition E (190° C., 2.16 kg load), and is conventionally designated as $I_{2.16}$. The term "Flow Index" refers to the melt flow rate of the resin measured according to ASTM D-1238, condition F (190° C., 21.6 kg load), and is conventionally designated as $I_{21.6}$. Melt index and flow index have units of g/10 min, or equivalently dg/min. The term "MFR" refers to the ratio $I_{21.6}/I_{2.16}$, and is dimensionless.

Specific Energy Input (SEI) refers to the energy input to the main drive of the extruder, per unit weight of melt processed resin, and is expressed in units of hp·hr/lb or kW·hr/kg.

Density (g/cm$^3$) was determined using chips cut from plaques compression molded in accordance with ASTM D-1928-96 Procedure C, aged in accordance with ASTM D618 Procedure A, and measured according to ASTM D1505-96.

Color (b) was measured with a Hunter Lab colorimeter, using the polyethylene pellets.

Mw/Mn was determined using ASTM 6579. The gel chromatograph CPC 220 was operated at 135° C. Approximately 40 mg of polymer was dissolved in 4.1 ml of trichlorobenzene at 160° C. with mixing for 4 hours. The flow rate was 1.0 ml/min. and the injection volume was 300 microliters. Polystyrene standards of known molecular weight were used to calibrate the system.

In Comparative Example 1, a chrome-catalyzed resin produced in a slurry loop reactor was blow molded. The swell numbers were generated on a 4 head Uniloy Model 350R-2. One-gallon bottles were blow molded at a constant weight of 75 g and the width of the tab on the bottom of the bottle measured. In Comparative Example 2, a bimodal resin having a melt index 12.16 of about 0.4 g/10 min and a density of 0.957 g/cc was produced under normal processing conditions and blow molded. Normal processing conditions would be a melt temperature of 405° F. (207° C.) under a nitrogen atmosphere with primary antioxidant added upstream. A feed rate of 50,000 lb/hr (22,727 kg/hr) to 55,000 lb/hr (25,000 kg/hr) was maintained. In Examples 3-5, the resin of Comparative Example 2 was produced according to the method of Comparative Example 2, except that oxygen was added to the compounder at different rates while the melt temperature was kept at a constant 430° F. (221° C.). In Example 3, oxygen was added as air at the rate of 10 pounds of air (4.55 kg, 40 ppm) per hour in the melting zone of the compounder. In Example 4, oxygen was added as air at the rate of 40 pounds (18.2 kg, 160 ppm) of air per hour in the melting zone of the compounder. In Example 5, oxygen was added as air at the rate of 40 pounds (18.2 lb, 160 ppm) of air per hour in the melting zone of the compounder, and no additives were used. The results of Examples 1-5 are seen in Table 1.

TABLE 1

Four Head Uniloy

| Example | MI$_2$ | MI$_{22}$ | MFR | Color (Hunter B) | Swell (4 head) | Vis. at 0.1 l/s (Pa-s) | Vis. at 100 l/s (Pa-s) |
|---|---|---|---|---|---|---|---|
| Comp 1 | 0.29 | 32.8 | 112 | 1.7 | 6.01 | 39,964 | 1,355 |
| Comp 2 | 0.42 | 39.4 | 93 | 0.3 | 6.40 | 25,460 | 1,502 |
| Exam 3 | 0.27 | 33.1 | 124 | 2.2 | 5.92 | 26,985 | 1,187 |
| Exam 4 | 0.18 | 31.5 | 171 | 2.9 | 5.69 | 34,891 | 1,113 |
| Exam 5 | 0.21 | 32.0 | 156 | 2.3 | 5.63 | 56,517 | 1,239 |

TABLE 2

Tailored Samples - Battenfeld

|  | Comp 1 | Comp 2 | Exam 3 | Exam 4 | Exam 5 |
|---|---|---|---|---|---|
| Swell (head 2) | 5.506 | 5.723 | 5.443 | 5.234 | 5.207 |
| Parison drop time (sec) | 1.56 | 1.25 | 1.25 | 1.18 | 1.10 |
| Extruder Pressure (psig/kPa) | 2532/17458 | 2227/15355 | 2175/15000 | 2158/14879 | 2180 |
| Parison Temp (head 1) (° F./° C.) | 406/208 | 404/207 | 407/208 | 405/207 | 406/208 |
| (head 2) | 407/208 | 405/207 | 407/208 | 405/207 | 405/207 |
| Stock Temp (° F./° C.) | 350/177 | 351/177 | 348/176 | 350/177 | 350/177 |
| Cycle (sec) | 16.7 | 16.9 | 16.9 | 16.8 | 16.7 |
| Screw rpm | 85 | 85 | 85 | 85 | 85 |
| Motor rpm | 1093 | 1090 | 1090 | 1090 | 1090 |

TABLE 3

Tailored Samples - Two Head Uniloy

| SAMPLE | MELT. PRESSURE (psig/kPa) | CYCLE TIME (sec) |
|---|---|---|
| Comp 1 | 1060/7307 | 11.40 |
| Comp 2 | 1040/7170 | 10.77 |
| Exam 3 | 1000/6895 | 10.78 |
| Exam 4 | 950/6550 | 10.84 |
| Exam 5 | 930/6412 | 11.20 |

Table 1 shows that as the severity of tailoring increases i.e., the amount of oxygen increases, the melt index decreases, which is an indication of increasing melt strength. Additionally, the relatively higher viscosities of Examples 3-5 over Comparative Examples 1 and 2, at the lower shear rate (0.1 l/s), is an indication that Examples 3-5 have a higher melt strength than Comparative Examples 1 and 2. Table 1 further shows a significant decrease in swell when comparing Comparative Example 2 with Examples 3, 4, and 5.

Moreover, the rheological data in Table 1 evidences an increase in processability in the oxygen tailored Examples 3-5 over the Comparative Examples 1 and 2. This is seen in that the viscosity of Examples 3-5 are relatively lower than the viscosity of Comparative Examples 1 and 2 at the higher shear rate (100 l/s). Normally, one would expect processability to decrease with the decreasing melt index. Surprisingly, however, the rheological data in Table 1 evidences that the processability of Examples 3-5 increased as the melt index of Examples 3-5 decreased, when compared to Comparative Examples 1 and 2.

This surprising result was confirmed by actual bottle fabrication. The resin used in each of the above examples was blow molded on a continuous extrusion blow molder, Battenfeld, and a reciprocating blow molder, Uniloy. The Battenfeld blow molder was a Model VK1-5 produced by Battenfeld-Fisher Corporation. The Uniloy was a Model 350R-1 produced by Uniloy-Millacron Inc. When processed in the Uniloy blow molder the resins of Examples 3-5 required less extruder pressure over Comparative Examples 1 and 2, which is an indication of easier processing. Specifically, Comparative Examples 1 and 2 required an extruder pressure of 2,532 psi (17458 kPa) and 2,227 psi (15355 kPa) respectively; whereas, Examples 3-5 required an extruder pressure of 2,175 (14997 kPa); 2,158 psi (14879 kPa); and 2,180 psi (15031 kPa) respectively. Likewise, when processed in the Battenfeld blow molder the resins of Examples 3-5 required less melt pressure over Comparative Examples 1 and 2, indicating easier processing. Specifically, Comparative Examples 1 and 2 required a melt pressure of 1,060 psi (7308 kPa) and 1,040 psi (7171 kPa) respectively; whereas, Examples 3-5 required a melt pressure of 1,000 psi (6895 kPa); 950 psi (6550 kPa); and 930 psi (6412 kPa) respectively.

All patents, test procedures, and other documents cited herein, including priority documents, are fully incorporated by reference to the extent such disclosure is not inconsistent with this invention and for all jurisdictions in which such incorporation is permitted.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A process for oxygen-tailoring a polyethylene blow molding resin, the process comprising:
    (a) conveying the polyethylene resin having a MWD greater than about 12 through a feed zone, a melt-mixing zone downstream of the feed zone, and a melt zone downstream of the melt-mixing zone, wherein the temperature of the polyethylene resin ranges from about 216° C. to about 260° C. in the melt zone; and
    (b) contacting the resin with at least about 20 parts by weight oxygen per million parts by weight resin (ppm (wt) $O_2$).

2. The process of claim 1, wherein the polyethylene resin has the MWD of at least about 15.

3. The process of claim 1, wherein the oxygen ranges from about 40 to about 500 ppm (wt) $O_2$.

4. The process of claim 1, wherein the oxygen ranges from about 80 to about 300 ppm (wt) $O_2$.

5. The process of claim 1, wherein the temperature of the polyethylene resin ranges from about 218° C. to about 232° C. in the melt zone.

6. The process of claim 1, wherein contacting the resin with the oxygen comprises providing the oxygen to the zone, the melt-mixing zone, or the melt zone.

7. The process of claim 6, further comprising contacting the resin with a primary antioxidant upstream of contacting the resin with oxygen, wherein the primary antioxidant can be added to the same or different zone as the oxygen.

8. The process of claim 6, further comprising contacting the resin with a primary antioxidant downstream of contacting the resin with oxygen, wherein the primary antioxidant can be added to the same or different zone as the oxygen.

9. The process of claim 7 or 8, wherein the oxygen comprises a gas mixture.

10. The process of claim 7 or 8, wherein the primary antioxidant comprises a phenolic antioxidant, a hindered amine antioxidant, or mixtures thereof.

11. The process of claim 6, further comprising contacting the resin with a secondary antioxidant upstream of contacting the resin with oxygen, wherein the secondary antioxidant can be added to the same or different zone as the oxygen.

12. The process of claim 6, further comprising contacting the resin with a secondary antioxidant downstream of contacting the resin with oxygen, wherein the secondary antioxidant can be added to the same or different zone as the oxygen.

13. The process of claim 1, wherein the polyethylene resin has a density of at least about 0.930 $g/cm^3$.

14. The process of claim 1, wherein the polyethylene resin has a density of at least about 0.945 $g/cm^3$.

15. The process of claim 1, wherein the polyethylene resin has a bimodal molecular weight distribution.

16. The oxygen-tailored polyethylene resin formed according to the process of claim 1.

17. The polyethylene resin of claim 16, wherein the resin has a tailoring ratio ranging from about 20 to about 35.

18. A polyethylene blow molded article comprising the polyethylene resin formed by the process of claim 1.

19. A process for oxygen-tailoring a high density polyethylene blow molding resin having a bimodal molecular weight distribution, the process comprising:
    (a) conveying a polyethylene resin having a MWD greater than about 12 through a feed zone, a melt-mixing zone downstream of the feed zone, and a melt zone downstream of the melt-mixing zone, wherein the temperature of the polyethylene resin ranges from about 216° C. to about 260° C. in the melt zone;
    (b) contacting the resin in the melt-mixing zone with from about 20 to about 500 parts by weight oxygen per million parts by weight resin (ppm (wt) $O_2$).

20. The process of claim 19, wherein the resin is contacted in the melt zone with a primary antioxidant comprising a phenolic antioxidant, a hindered amine antioxidant, or a mixture thereof.

21. The process of claim 19, wherein the resin is contacted in the melt zone with a secondary antioxidant.

22. The process of claim 19, wherein the oxygen ranges from about 80 to about 300 ppm (wt) $O_2$.

23. The process of claim 20 or 21, wherein the oxygen comprises part of a gas mixture.

24. The process of claim 19, wherein the temperature of the polyethylene resin ranges from about 218° C. to about 232° C. in the melt zone.

25. The oxygen-tailored polyethylene resin formed according to the process of claim 19.

26. The polyethylene resin of claim 25, wherein the resin has a tailoring ratio between about 20 to about 35.

27. A polyethylene blow molded article comprising the polyethylene resin formed by the process of claim 19.

28. A process for oxygen-tailoring polyethylene blow molding resin, the process comprising:
    (a) conveying a polyethylene resin having a MWD greater than about 12 through a feed zone, a melt-mixing zone downstream of the feed zone, and a melt zone downstream of the melt-mixing zone, wherein the temperature of the polyethylene resin ranges from about 216° C. to about 260° C. in the melt zone; and
    (b) contacting the resin with oxygen in an amount sufficient to form an oxygen-contacted resin having a tailoring ratio ranging from about 20 to about 35.

29. A process for oxygen-tailoring a high density polyethylene blow molding resin, the process comprising:
conveying a polyethylene resin having a bimodal molecular weight distribution through a feed zone, a melt-mixing zone downstream of the feed zone, and a melt zone downstream of the melt-mixing zone, wherein the temperature of the resin ranges from about 216° C. to about 260° C. in the melt zone;
contacting the resin with from about 20 to about 500 parts by weight oxygen per million parts by weight resin (ppm (wt) $O_2$); and
contacting the resin with a primary antioxidant comprising a phenolic antioxidant, a hindered amine antioxidant, or a mixture thereof.

30. The process of claim 29, wherein the resin is contacted in the melt zone with the oxygen and the primary antioxidant.

31. The process of claim 29, further comprising contacting the resin with a secondary antioxidant selected from the group consisting of aliphatic thiols and phosphites.

32. The process of claim 29, wherein the oxygen ranges from about 80 to about 300 ppm (wt) $O_2$.

33. The process of claim 29, wherein the temperature of the polyethylene resin ranges from about 218° C. to about 232° C. in the melt zone.

34. The polyethylene resin of claim 29, wherein the resin has a tailoring ratio between about 20 to about 35.

35. An oxygen-tailored polyethylene resin formed according to the process of claim 29.

36. A polyethylene blow molded article comprising the polyethylene resin formed by the process of claim 29.

* * * * *